(12) United States Patent
Ferguson et al.

(10) Patent No.: US 10,738,604 B2
(45) Date of Patent: Aug. 11, 2020

(54) METHOD FOR CONTAMINATION MONITORING

(71) Applicant: Schlumberger Technology Corporation, Sugar Land, TX (US)

(72) Inventors: Richard Ferguson, Shibuya-ku (JP); Magdy Samir Osman, Doha (QA)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 275 days.

(21) Appl. No.: 15/693,607

(22) Filed: Sep. 1, 2017

(65) Prior Publication Data

US 2018/0066518 A1   Mar. 8, 2018

Related U.S. Application Data

(60) Provisional application No. 62/383,040, filed on Sep. 2, 2016.

(51) Int. Cl.
| | |
|---|---|
| *E21B 49/08* | (2006.01) |
| *C09K 8/58* | (2006.01) |
| *E21B 43/16* | (2006.01) |
| *E21B 49/10* | (2006.01) |
| *E21B 47/00* | (2012.01) |

(52) U.S. Cl.
CPC .............. *E21B 49/087* (2013.01); *C09K 8/58* (2013.01); *E21B 43/16* (2013.01); *E21B 49/10* (2013.01); *E21B 47/00* (2013.01); *E21B 49/088* (2013.01); *E21B 2049/085* (2013.01)

(58) Field of Classification Search
None
See application file for complete search history.

(56) References Cited

U.S. PATENT DOCUMENTS

| | | | | |
|---|---|---|---|---|
| 3,685,345 | A | * | 8/1972 | Wise ................... E21B 49/005 73/19.1 |
| 4,804,050 | A | * | 2/1989 | Kerfoot .................. E21B 7/26 175/20 |
| 4,860,581 | A | | 8/1989 | Zimmerman et al. |
| 4,936,139 | A | | 6/1990 | Zimmerman et al. |
| 5,992,213 | A | * | 11/1999 | Tartre ...................... B09C 1/00 73/19.01 |
| 6,301,959 | B1 | | 10/2001 | Hrametz et al. |
| 6,582,251 | B1 | | 6/2003 | Burke et al. |
| 6,585,045 | B2 | | 7/2003 | Lee et al. |
| 6,609,568 | B2 | | 8/2003 | Krueger et al. |
| 6,719,049 | B2 | | 4/2004 | Sherwood et al. |

(Continued)

FOREIGN PATENT DOCUMENTS

| | | |
|---|---|---|
| GB | 2371651 A | 7/2002 |
| WO | 2005/020272 A2 | 3/2005 |
| WO | 2005/083846 A1 | 9/2005 |

*Primary Examiner* — Jill E Culler
(74) *Attorney, Agent, or Firm* — Trevor G. Grove

(57) ABSTRACT

A method of evaluating a fluid from a subterranean formation drawn into a downhole tool positioned in a wellbore penetrating the subterranean formation is provided. This method involves drawing fluid from a formation into a flowline, measuring at least one property of the fluid in the flowline and detecting stabilization of the property or properties of the fluid in the flowline. An electrochemical sensor for measuring contents of a fluid or gas at high pressure and/or high temperature may be used.

19 Claims, 2 Drawing Sheets

(56) References Cited

U.S. PATENT DOCUMENTS

| | | | |
|---|---|---|---|
| 7,003,405 B1* | 2/2006 | Ho | G01V 9/007 |
| | | | 422/68.1 |
| 7,666,679 B2* | 2/2010 | Herzhaft | E21B 49/00 |
| | | | 422/68.1 |
| 8,758,593 B2 | 6/2014 | Lawrence et al. | |
| 2004/0000433 A1 | 1/2004 | Hill et al. | |
| 2009/0090176 A1 | 4/2009 | Toribio et al. | |
| 2011/0048969 A1 | 3/2011 | Lawrence et al. | |
| 2013/0112406 A1* | 5/2013 | Zuo | E21B 49/10 |
| | | | 166/250.08 |
| 2015/0122487 A1 | 5/2015 | Lawrence et al. | |

* cited by examiner

METHOD FOR CONTAMINATION MONITORING

CROSS-REFERENCE TO RELATED APPLICATIONS

This application claims priority and benefit to Provisional U.S. Patent Application, Ser. No. 62/383,040, entitled: "Method for Contamination Monitoring" and filed on Sep. 2, 2016, the entirety of which is incorporated herein.

BACKGROUND OF THE INVENTION

Wellbores are drilled to locate and produce hydrocarbons. A downhole drilling tool with a bit at and end thereof is advanced into the ground to form a wellbore. As the drilling tool is advanced, a drilling mud is pumped through the drilling tool and out the drill bit to cool the drilling tool and carry away cuttings. The fluid exits the drill bit and flows back up to the surface for recirculation through the tool. The drilling mud is also used to form a mudcake to line the wellbore.

During the drilling operation, it is desirable to perform various evaluations of the formations penetrated by the wellbore. In some cases, the drilling tool may be provided with devices to test and/or sample the surrounding formation. In some cases, the drilling tool may be removed and a wireline tool may be deployed into the wellbore to test and/or sample the formation. In other cases, the drilling tool may be used to perform the testing or sampling. These samples or tests may be used, for example, to locate valuable hydrocarbons.

Formation evaluation often requires that fluid from the formation be drawn into the downhole tool for testing and/or sampling. Various devices, such as probes, are extended from the downhole tool to establish fluid communication with the formation surrounding the wellbore and to draw fluid into the downhole tool. A typical probe is a circular element extended from the downhole tool and positioned against the sidewall of the wellbore. A rubber packer at the end of the probe is used to create a seal with the wellbore sidewall. Another device used to form a seal with the wellbore sidewall is referred to as a dual packer. With a dual packer, two elastomeric rings expand radially about the tool to isolate a portion of the wellbore therebetween. The rings form a seal with the wellbore wall and permit fluid to be drawn into the isolated portion of the wellbore and into an inlet in the downhole tool.

The mudcake lining the wellbore is often useful in assisting the probe and/or dual packers in making the seal with the wellbore wall. Once the seal is made, fluid from the formation is drawn into the downhole tool through an inlet by lowering the pressure in the downhole tool. Examples of probes and/or packers used in downhole tools are described in U.S. Pat. Nos. 6,301,959; 4,860,581; 4,936,139; 6,585,045; 6,609,568 and 6,719,049 and US Patent Application No. 2004/0000433.

The collection and sampling of underground fluids contained in subsurface formations is well known. In the petroleum exploration and recovery industries, for example, samples of formation fluids are collected and analyzed for various purposes, such as to determine the existence, composition and productivity of subsurface hydrocarbon fluid reservoirs. This aspect of the exploration and recovery process can be crucial in developing drilling strategies and impacts significant financial expenditures and savings.

To conduct valid fluid analysis, the fluid obtained from the subsurface formation should possess sufficient purity, or be virgin fluid, to adequately represent the fluid contained in the formation. As used herein, and in the other sections of this patent, the terms "virgin fluid", "acceptable virgin fluid" and variations thereof mean subsurface fluid that is pure, pristine, connate, uncontaminated or otherwise considered in the fluid sampling and analysis field to be sufficiently or acceptably representative of a given formation for valid hydrocarbon sampling and/or evaluation.

Various challenges may arise in the process of obtaining virgin fluid from subsurface formations. Again with reference to the petroleum-related industries, for example, the earth around the borehole from which fluid samples are sought typically contains contaminates, such as filtrate from the mud utilized in drilling the borehole. This material often contaminates the virgin fluid as it passes through the borehole, resulting in fluid that is generally unacceptable for hydrocarbon fluid sampling and/or evaluation. Such fluid is referred to herein as "contaminated fluid." Because fluid is sampled through the borehole, mudcake, cement and/or other layers, it is difficult to avoid contamination of the fluid sample as it flows from the formation and into a downhole tool during sampling. A challenge thus lies in monitoring the contamination of the virgin fluid during fluid extraction from the formation. The present invention relates to techniques for performing formation evaluation of a subterranean formation by a downhole tool positioned in a wellbore penetrating the subterranean formation. More particularly, the present invention relates to techniques for monitoring the contamination of formation fluids drawn into and/or evaluated by the downhole tool. More particularly, the present invention relates to a method of contamination monitoring by using an electrochemical sensor operable at high temperature and/or high pressure conditions.

SUMMARY

In one or more embodiments, a method of evaluating a fluid from a subterranean formation drawn into a downhole tool positioned in a wellbore penetrating the subterranean formation is disclosed. The method can include drawing fluid from a formation into a flowline; measuring a property of the fluid in the flowline with an electrochemical sensor, the fluid property being a physical property of the fluid that distinguishes between mud filtrate and reservoir fluid; and detecting stabilization of the property of the fluid in the flowline. In another embodiment, a method of evaluating a fluid from a subterranean formation drawn into a downhole tool positioned in a wellbore penetrating the subterranean formation is disclosed. The method can include drawing fluid from a formation into a flowline; measuring a property of the fluid in the flowline with a sensor, wherein the fluid property is a concentration of a chemical species; and detecting stabilization of the property of the fluid in the flowline. In one or more additional embodiments a method of evaluating a fluid from a subterranean formation drawn into a downhole tool positioned in a wellbore penetrating the subterranean formation are disclosed. The method can include drawing fluid from a formation into a flowline; measuring a first property of the fluid in the flowline with a first sensor; measuring a second property of the fluid in the flowline with a second sensor, wherein the first and second fluid properties are each a concentration of a different chemical species; and detecting stabilization of the first and/or the second property of the fluid in the flowline.

Other features and advantages of the present disclosure will become apparent from the following description of the invention which refers to the accompanying drawings.

BRIEF DESCRIPTION OF THE DRAWINGS

For a detailed description of preferred embodiments of the invention, reference will now be made to the accompanying drawings wherein.

DETAILED DESCRIPTION OF EMBODIMENTS OF THE INVENTION

Figure 1:
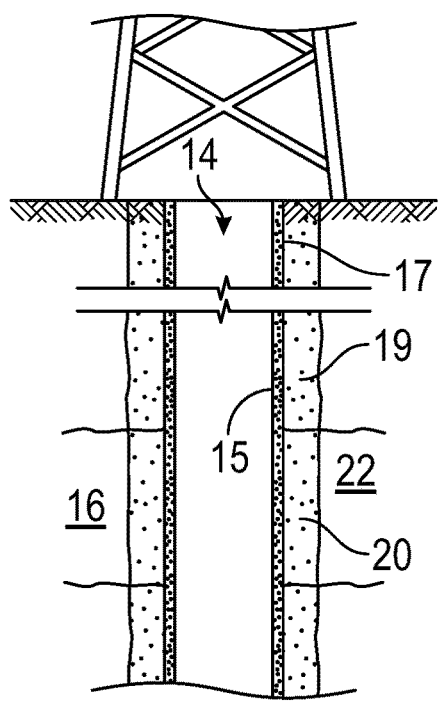
FIG. 1 is a schematic view of a subsurface formation penetrated by a wellbore lined with mudcake, depicting the reservoir fluid in the subsurface formation.

Presently preferred embodiments of the invention are shown in the above-identified figures and described in detail below. In describing the preferred embodiments, like or identical reference numerals are used to identify common or similar elements. The figures are not necessarily to scale and certain features and certain views of the figures may be shown exaggerated in scale or in schematic in the interest of clarity and conciseness.

FIG. 1 depicts a subsurface formation 16 penetrated by a wellbore 14. A layer of mud cake 15 lines a sidewall 17 of the wellbore 14. Due to invasion of mud filtrate into the formation during drilling, the wellbore is surrounded by a cylindrical layer known as the invaded zone 19 containing contaminated fluid 20 that may or may not be mixed with virgin fluid. Beyond the sidewall of the wellbore and surrounding contaminated fluid, reservoir fluid or virgin fluid 22 is located in the formation 16. As shown in FIG. 1, contaminates tend to be located near the wellbore wall in the invaded zone 19.

Figure 2:
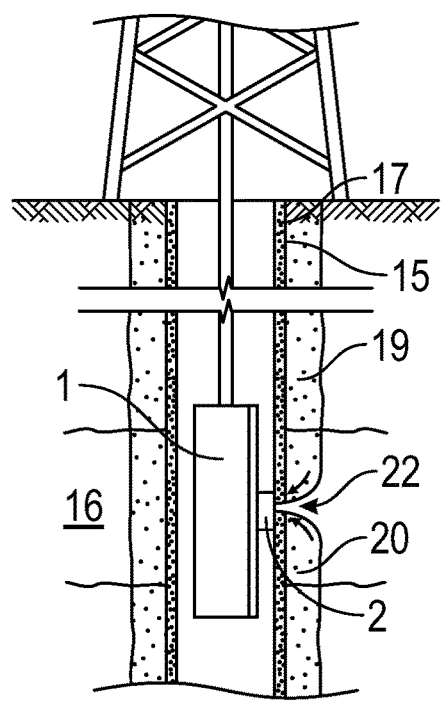
FIG. 2 is a schematic view of a down hole tool positioned in the wellbore with a probe extending to the formation, depicting the flow of contaminated and reservoir fluid into a downhole sampling tool.

FIG. 2 shows the typical flow patterns of the formation fluid as it passes from subsurface formation 16 into a downhole tool 1. The downhole tool 1 is positioned adjacent the formation and a probe 2 is extended from the downhole tool through the mudcake 15 to the sidewall 17 of the wellbore 14. The probe 2 is placed in fluid communication with the formation 16 so that formation fluid may be passed into the downhole tool 1. Initially, as shown in FIG. 1, the invaded zone 19 surrounds the sidewall 17 and contains contamination. As fluid initially passes into the probe 2, the contaminated fluid 20 from the invaded zone 19 is drawn into the probe with the fluid thereby generating fluid unsuitable for sampling. However, as shown in FIG. 2, after a certain amount of fluid passes through the probe 2, the reservoir fluid 22 breaks through and begins entering the probe. In other words, a more central portion of the fluid flowing into the probe gives way to the reservoir fluid, while the remaining portion of the fluid is contaminated fluid from the invasion zone. The challenge remains in adapting to the flow of the fluid so that the reservoir fluid is collected in the downhole tool during sampling.

Figure 3:
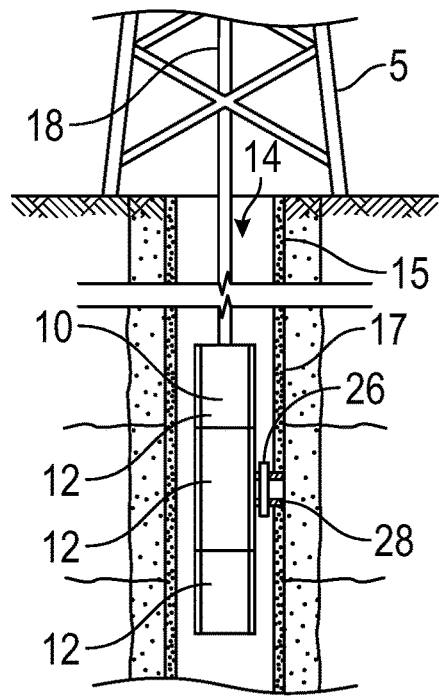
FIG. 3 is a schematic view of downhole wireline tool having a fluid sampling device.

Referring to FIG. 3, an example environment within which the present embodiment may be used is shown. In the illustrated example, a down hole tool 10 is carried in the well. An example commercially available tool 10 is the Modular Formation Dynamics Tester (MDT) by Schlumberger Corporation, the assignee of the present application and further depicted, for example, in U.S. Pat. Nos. 4,936,139 and 4,860,581 hereby incorporated by reference herein in their entireties.

The downhole tool 10 is deployable into bore hole 14 and suspended therein with a conventional wire line 18, or conductor or conventional tubing or coiled tubing, below a rig 5 as will be appreciated by one of skill in the art. The illustrated tool 10 is provided with various modules and/or components 12, including, but not limited to, a fluid sampling device 26 used to obtain fluid samples from the subsurface formation 16. The fluid sampling device 26 is provided with a probe 28 extendable through the mudcake 15 and to sidewall 17 of the borehole 14 for collecting samples. The samples are drawn into the downhole tool 10 through the probe 28.

Figure 4:
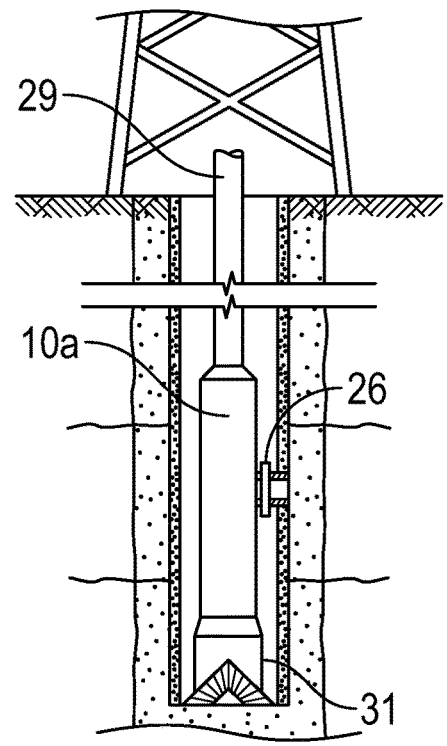
FIG. 4 is a schematic view of a downhole drilling tool with an alternate embodiment of the fluid sampling device of FIG. 3.

While FIG. 3 depicts a modular wireline sampling tool for collecting samples, it will be appreciated by one of skill in the art that such system may be used in any downhole tool. For example, FIG. 4 shows an alternate downhole tool 10a having a fluid sampling system 26a therein. In this example, the downhole tool 10a is a drilling tool including a drill string 29 and a drill bit 31. The downhole drilling tool 10a may be of a variety of drilling tools, such as a Measurement-While-Drilling (MWD), Logging-While Drilling (LWD) or other drilling system. The tools 10 and 10a of FIGS. 3 and 4, respectively, may have alternate configurations, such as modular, unitary, wireline, coiled tubing, autonomous, drilling and other variations of downhole tools.

During reservoir sampling operations it is important to achieve the cleanest possible samples, free from drilling fluid contamination. During the drilling process the fluid used to support the wellbore (drilling fluid) naturally enters the near well bore formation rock (filtrate). It is the objective of sampling to remove as much as possible of this fluid before capturing a sample of the fluid for the most representative analysis at surface.

Differentiation between reservoir fluid or virgin fluid and mud filtrate is a key process to determine the optimum point at which to capture a sample. Typically methods such as optical spectroscopy, fluid resistivity or density/viscosity measurements are used to monitor the clean-up process and help determine when optimum samples can be captured, however, in some cases the differentiation between reservoir fluid and drilling fluid filtrate are very low and not very clear to the user or software doing the interpretation. This can lead to extended pumping times in hope of obtaining a representative sample of the formation fluid. In the case of obtaining a sample from a reservoir containing water based fluid while the drilling fluid is also water based then the differentiation between the two fluids if significantly challenging.

By monitoring a physical property as for example the presence of chemical species in the reservoir fluid that are not expected to be present in the filtrate it is possible monitor the clean-up of the fluid with a much clearer differentiation than relying on specific physical properties such as optical density, resistivity or viscosity.

Among the various techniques to measure a physical property of wellbore fluids, a electrochemical sensor may be used. Such a sensor may be used to measure $H_2S$, $CO_2$, pH and scale-forming ion species or other components in the reservoir fluid. Gaseous molecules such as $H_2S$ or $CO_2$ could be monitored to assess the level of contamination of fluid being pumped through a formation sampling tool and judge the optimum time to capture a sample.

Figure 5:
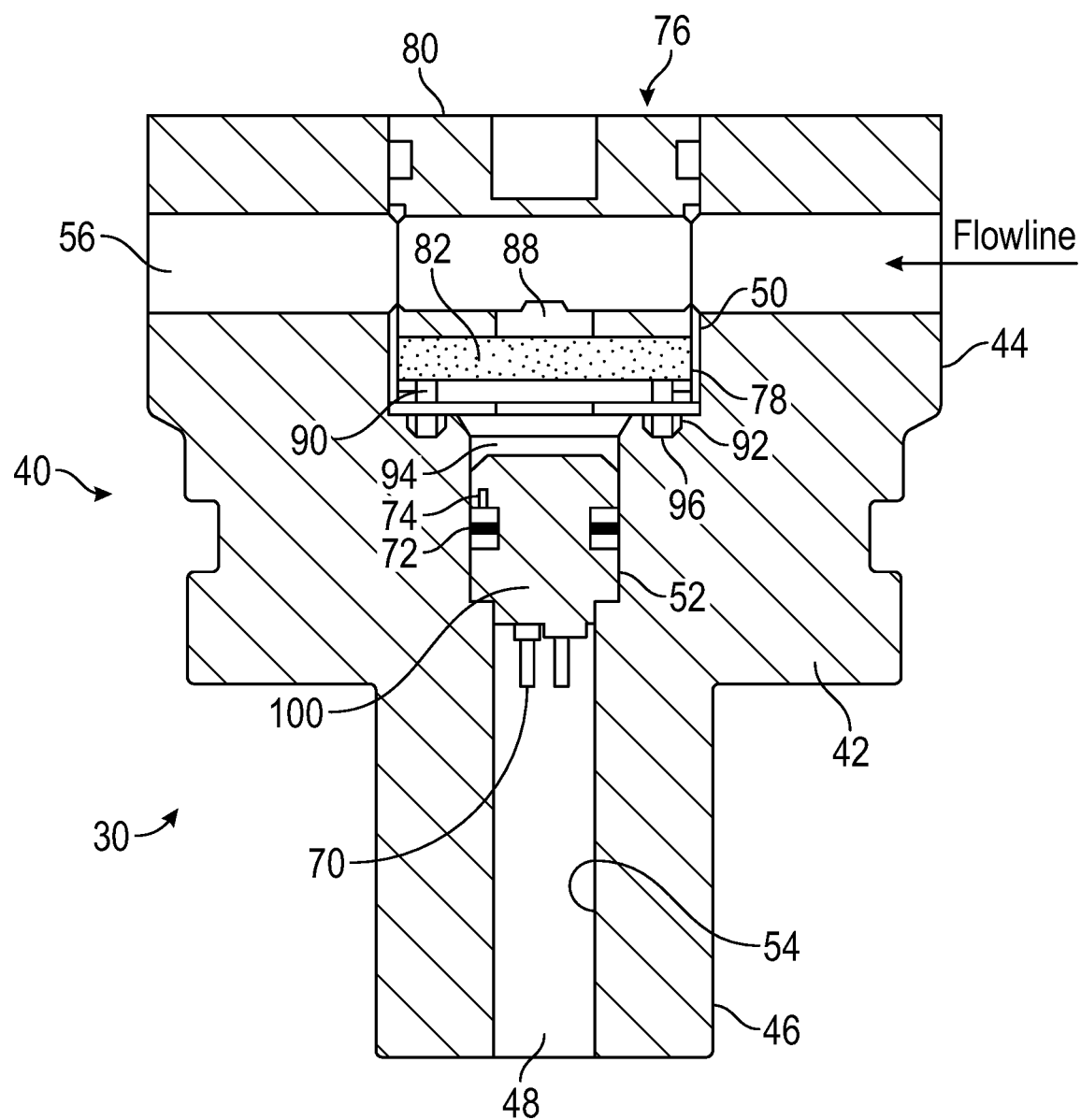
FIG. 5 shows an electrochemical sensor in more detail.

The electrochemical sensor 30 is shown in more detail in FIG. 5. In one embodiment, the electrochemical sensor 30 includes a generally cylindrical housing 40, which may be made from polyetheretherketone (PEEK) and which includes a main housing member 42 having an upper portion 44 (as viewed in the drawings), a reduced diameter lower portion 46, and a stepped diameter cylindrical bore 48 extending coaxially through it from top to bottom. The bore 48 has a large diameter upper portion 50 wholly within the upper portion 44 of the main housing member 42, an intermediate diameter portion 52 also wholly within the upper portion of the main housing member, and a reduced diameter portion 54 largely within the lower portion 46 of the main housing member 42.

A flowpath 56 for the fluid whose content of the components including but not limited to hydrogen sulfide, carbon dioxide, and pH and scale forming ion species is to be sensed extends diametrically through the upper portion 44 of the main housing member 42, intersecting the upper portion of the bore 48.

Disposed in the intermediate diameter portion 52 of the bore 48, and resting on the shoulder defined between the reduced diameter portion 54 and the intermediate diameter portion 52, is a cylindrical electrode assembly 100. The electrode assembly 100 includes a cylindrical mold resin housing for example made of PEEK and a plurality of electrodes including a working electrode, a reference electrode and a counter/guard electrode, which are electrically connected to electrical leads 70, which exit the main housing 30 via the reduced diameter portion 54 of the bore 48. The detailed structure of the electrode assembly 100 will be explained later.

A seal ring, an O-ring 72 in this embodiment, made of VITON™ is disposed in a groove 74 extending coaxially round the body of the electrode assembly 100 to seal the electrode assembly 100 within the intermediate diameter portion 52 of the bore 48.

Disposed in the large diameter upper portion 50 of the bore 48, and resting on the shoulder defined between the intermediate diameter portion 52 and the large diameter upper portion 50 is a cylindrical membrane retainer assembly 76. The cylindrical membrane retainer assembly 76 includes a cup-shaped housing member 78, a cylindrical housing member 80 which screws part of the way into the cup-shaped housing member 78, and a gas permeable membrane 82 in the form of a circular plate made of zeolite or other suitable ceramic material coaxially located in the cup-shaped housing member 78, in the space between the bottom of the inside of the cup shape of the housing member 78 and the bottom of the housing member 80.

The housing member 80 has a diametrically extending flow path (not shown) therethrough, and the housing member 78 has diametrically opposed ports (not shown) aligned with the opposite ends of the flow path of the housing member 80, the flow path of the housing member 80 and the ports of the housing member 78 being aligned with the flow path 56 in the upper part 44 of the main housing member 42. The housing member 80 further includes a short duct 88 communicating between the flow path thereof and the bottom of the housing member 80, and therefore communicating with the upper surface of the membrane 82.

The bottom of the housing member 80 is flat, and bears on the upper surface of the membrane 82, pressing it toward the bottom of the inside of the housing member 78. An O-ring seal 90 made of VITON™, for example, is trapped between the lower surface of the membrane 82 and the bottom of the inside of the housing member 78 to provide sealing around the entire periphery of the lower surface of the membrane 82, while the flat bottom of the housing member 80 and the upper surface of the membrane 82 provides a seal around the entire periphery of the upper side of the membrane 82. A further O-ring seal 92 also made of VITON™, for example, is disposed in a groove 96 formed coaxially in the shoulder defined between the intermediate diameter portion 52 and the large diameter portion of the bore 48, and is trapped between the underside of the bottom of the housing member 78 and the shoulder.

The generally cylindrical space beneath the underside of the membrane 82 and the top of the electrode assembly 100 constitutes a reaction chamber, and is filled with a reaction solution containing a precursor or catalyst, for example, dimethylphenylenediamine (DMPD).

The sealing of the membrane 82 in the housing members 78 and 80 using a surface-to-surface seal and the O-ring seal 90, coupled with the sealing provided by the O-ring seal 92, ensures that the reaction solution is not washed out of the chamber 94 by the hot, high pressure hydrocarbons in the flow path 56, while the materials used, in particular for the membrane 82, are also able to withstand the hostile borehole environment.

Other examples of electrochemical sensors may be chosen as for example, in U.S. Pat. No. 8,758,593 and U.S. Patent Application 2015/0122487 from same assignee, hereby incorporated by reference herein in their entireties.

Referring back to FIG. 2, in operation, the sensor 30 fits in a cylindrical recess in a block (not shown) through which the conduit 26 passes, with the flow path 56 in alignment with the conduit 26, and with sealing provided by the O-ring seal 92 in the groove 96 in the upper portion 44 of the housing 40 of the sensor 30. The upper side of the membrane 82 in the sensor 30 is thus exposed via the flow path 56, the ports of the housing member 78, the flow path of the housing member 80 and the duct 88 to the hydrocarbons in the conduit 26. Suitable electronic measurement equipment is used to apply a cyclically varying potential between the working electrode and the reference electrode to measure the peak currents flowing between the working electrode and the counter electrode.

In this embodiment, before being molded into the mold resin housing, the electrode structure is coated with the non gas/fluid permeable insulating coating. Therefore, the conductive pin can be protected from direct contact with the hydrocarbon even if the hydrocarbon penetrates into the mold resin housing when the electrode faces high pressure and high temperature conditions. In addition, as the electrode structure is molded in the mold resin housing, complete isolation from the hydrocarbon can be further ensured.

Alternatively, instead of using the mold resin housing, a metal body can be used to attain enhanced robustness and mechanical rigidity. In such a case, the electrode structures are coated with the non gas/fluid permeable insulating coating prior to hermetic attachment to the metal body. Hermetic attachment techniques have been widely adapted in various commercial electrical connectors as disclosed in international patent publication numbers WO2005083846 and WO2005020272 and U.S. Pat. No. 6,582,251A.

The electrochemical sensor 30 may include a pressure balancing function that controls the pressures on both sides of the membrane 82, balancing them such that the pressure of the liquid reagents in the chamber 94 is substantially equal to the pressure of the hydrocarbons in the flowpath 56, thus substantially eliminating the pressure differential across the membrane 82, as described in GB 2,371,651A.

For example, utilizing an electrochemical $H_2S$ sensor which is exposed to the reservoir fluid flowpath can be used to monitor the build-up of $H_2S$ in the flowline. Once the sensor records a steady concentration of $H_2S$ in the flowline then it can be judged that the flowline fluid is not changing in composition and the clean-up process has been completed. As well, in one alternative embodiment, two measurements can be done simultaneously to improve accuracy of the prediction.

It will be understood from the foregoing description that various modifications and changes may be made in the preferred and alternative embodiments of the present invention without departing from its true spirit. The devices included herein may be manually and/or automatically activated to perform the desired operation. The activation may be performed as desired and/or based on data generated, conditions detected and/or analysis of results from downhole operations.

This description is intended for purposes of illustration only and should not be construed in a limiting sense. The scope of this invention should be determined only by the language of the claims that follow. The term "comprising" within the claims is intended to mean "including at least" such that the recited listing of elements in a claim are an open group. "A," "an" and other singular terms are intended to include the plural forms thereof unless specifically excluded.

It should also be understood that the discussion and various examples of methods and techniques described above need not include all of the details or features described above. Further, neither the methods described above, nor any methods which may fall within the scope of any of the appended claims, need be performed in any particular order. Yet further, the methods of the present invention do not require use of the particular embodiments shown and described in the present specification, such as, for example, the exemplary probe 28 of FIG. 4 or the exemplary electrochemical sensor 30 of FIG. 5, but are equally applicable with any other suitable structure, form and configuration of components.

Preferred embodiments of the present invention are thus well adapted to carry out one or more of the objects of the invention. Further, the apparatus and methods of the present invention offer advantages over the prior art and additional capabilities, functions, methods, uses and applications that have not been specifically addressed herein but are, or will become, apparent from the description herein, the appended drawings and claims.

While preferred embodiments of this invention have been shown and described, many variations, modifications and/or changes of the apparatus and methods of the present invention, such as in the components, details of construction and operation, arrangement of parts and/or methods of use, are possible, contemplated by the applicant, within the scope of the appended claims, and may be made and used by one of ordinary skill in the art without departing from the spirit or teachings of the invention and scope of appended claims. Because many possible embodiments may be made of the present invention without departing from the scope thereof, it is to be understood that all matter herein set forth or shown in the accompanying drawings is to be interpreted as illustrative and not limiting. Accordingly, the scope of the invention and the appended claims is not limited to the embodiments described and shown herein.

What is claimed is:

1. A method of evaluating a fluid from a subterranean formation drawn into a downhole tool positioned in a wellbore penetrating the subterranean formation, comprising:

drawing fluid from a formation into a flowline of the downhole tool;

performing a clean-up operation, wherein the clean-up operation comprises doing contamination monitoring to determine a level of contamination of the fluid being drawn into the flowline into the downhole tool using an electrochemical sensor to measure a chemical species that is present in reservoir fluid but is not present in mud filtrate to differentiate between the reservoir fluid and the mud filtrate; and capturing a sample of the fluid in the downhole tool when the measurement of the chemical species is steady and when the determined level of contamination of the fluid indicates that the fluid is substantially virgin reservoir fluid.

2. The method of claim 1, wherein the mud filtrate comprises a drilling fluid.

3. The method of claim 2, wherein the drilling fluid comprises oil based mud.

4. The method of claim 1, wherein the mud filtrate comprises water.

5. The method of claim 1, wherein the sample is captured when electrochemical sensor records a steady concentration of the chemical species after the concentration has built up to the steady concentration.

6. The method of claim 1, wherein the chemical species of the reservoir fluid comprises $H_2S$.

7. The method of claim 1, wherein the chemical species of the reservoir fluid comprises $CO_2$.

8. The method of claim 1, wherein the clean-up operation completes when the measurement of the chemical species is steady and wherein the sample is captured in response to the completion of the clean-up operation.

9. A method of evaluating a fluid from a subterranean formation drawn into a downhole tool positioned in a wellbore penetrating the subterranean formation, comprising:

drawing fluid from a formation into a flowline of a downhole tool configured to take a sample of reservoir fluid;

performing a clean-up operation, wherein the clean-up operation comprises doing contamination monitoring to determine a level of contamination of fluid being drawn into the flowline into the downhole tool using an electrochemical sensor to measure $H_2S$ to thereby differentiate between reservoir fluid and mud filtrate; and in response to completing the clean-up operation, capturing a sample of the fluid being drawn into the flowline in the downhole tool, wherein the clean-up operation completes when the electrochemical sensor records a steady concentration of $H_2S$, which indicates that the fluid is not changing in composition and thus that the fluid is substantially virgin reservoir fluid.

10. The method of claim 9, wherein the mud filtrate is substantially free of $H_2S$.

11. The method of claim 9, wherein the reservoir fluid comprises $H_2S$.

12. The method of claim 9, wherein the mud filtrate is due to an oil-based drilling mud.

13. The method of claim 9, wherein the mud filtrate is due to a water-based drilling mud.

14. A method of evaluating a fluid from a subterranean formation drawn into a downhole tool positioned in a wellbore penetrating the subterranean formation, comprising:
- drawing fluid from a formation into a flowline of a downhole tool;
- measuring a first chemical species concentration of the fluid in the flowline with a first electrochemical sensor;
- measuring a second chemical species concentration of the fluid in the flowline with a second electrochemical sensor, wherein the first chemical species is different from the second chemical species; and
- capturing a sample in the downhole tool in response to detecting that the first electrochemical sensor records a steady concentration of the first chemical species that indicates the fluid in the flowline is substantially virgin fluid and the second electrochemical sensor records a steady concentration of the second chemical species that indicates the fluid in the flowline is substantially virgin fluid.

15. The method of claim 14, wherein the chemical species are $H_2S$ and $CO_2$.

16. The method of claim 14, wherein the first chemical species comprises $H_2S$.

17. The method of claim 14, wherein the second chemical species comprises $CO_2$.

18. The method of claim 14, wherein the substantially virgin fluid comprises the first chemical species and the second chemical species.

19. The method of claim 14, wherein the first chemical species and the second chemical species are substantially absent from a drilling mud used in drilling the wellbore.

* * * * *